United States Patent [19]

Marino et al.

[11] Patent Number: 4,638,168
[45] Date of Patent: Jan. 20, 1987

[54] APPARATUS FOR MEASUREMENT OF HOLLOW FIBER DIMENSIONS

[75] Inventors: Dean F. Marino; William E. Ryan, both of Antioch; Arthur J. Kamp, Oakley, all of Calif.

[73] Assignee: The Dow Chemical Company, Midland, Mich.

[21] Appl. No.: 664,277

[22] Filed: Oct. 24, 1984

[51] Int. Cl.[4] .............................................. G01B 11/12
[52] U.S. Cl. ................................ 250/560; 250/358.1; 356/73.1; 356/384
[58] Field of Search ............................ 250/560, 358.1; 356/73.1, 384, 386, 387; 378/58, 59, 99

[56] References Cited

U.S. PATENT DOCUMENTS

| | | | |
|---|---|---|---|
| 2,349,429 | 5/1944 | Herzog | 378/59 |
| 3,108,186 | 10/1963 | Flavell | 378/59 |
| 3,671,726 | 5/1969 | Kerr | 235/151.3 |
| 4,228,353 | 5/1978 | Johnson | 250/356 |
| 4,229,970 | 1/1979 | Barker et al. | 73/56 |
| 4,307,296 | 12/1981 | Presby | 356/73.1 |
| 4,352,986 | 10/1982 | Pfieler | 378/24 |
| 4,393,305 | 7/1983 | Shimizu | 250/358.1 |
| 4,465,371 | 2/1982 | Pernick | 356/237 |

OTHER PUBLICATIONS

Dees et al., *J. Appl. Poly. Sci.*, vol. 18, pp. 1053, 1055 (1974).

*Primary Examiner*—Edward P. Westin

[57] ABSTRACT

An apparatus and method for determining the morphology or dimensions of a polymeric hollow fiber is disclosed. The light absorption pattern of the hollow fiber can be used to determine the inside and outside diameter of the fiber.

21 Claims, 2 Drawing Figures

APPARATUS FOR MEASUREMENT OF HOLLOW FIBER DIMENSIONS

BACKGROUND OF THE INVENTION

This invention relates to apparatus for measurement of internal and external dimensions of a non-opaque hollow fiber. More particularly, the apparatus determines hollow fiber dimensions from the electromagnetic radiation absorption of the fiber.

Hollow fibers have been used as membranes in a variety of separation processes. U.S. Pat. Nos. 3,228,876, 3,339,341, 3,422,008, 3,423,491, 3,703,962, 3,755,034, 4,364,759 and 4,421,529 represents a very small sample of the prior art pertaining to hollow fiber membranes. The external dimensions, wall thickness and bore size of the hollow fiber have a direct impact on its performance as a membrane. Consequently, accurately and easily to ensure uniform membrane characteristics.

The external dimensions of a solid fiber are conveniently measured optically. J. R. Dees et al, *J. Appl. Poly. Sci.*, 18, pp. 1053, 1055 (1974), report that the diameter of solid fibers can be determined from photographs of a projected image. Lasers have also been used in devices to measure external dimensions of fibers as well as other shapes. However, the bore diameter and wall thickness of hollow fibers have most commonly been determined by examination of magnified fiber sections. This procedure is not only tedious, but prone to inaccuracies due in part to the fiber handling required. Further, no on-line procedure for measurement or continuous monitoring of hollow fiber dimensions during fiber spinning has been available.

It has now been found that hollow fiber dimensions can be determined from the differential light absorption of the fiber. This fact is surprising since the effects of reflection, refraction and diffraction upon light incident on the hollow fiber would be expected to result in a very complex absorption pattern due to scattering and other effects. In this regard, it is noted that initial efforts to determine hollow fiber dimensions using a laser as a light source resulted in a complex absorption pattern.

SUMMARY OF THE INVENTION

An apparatus for measurement of both outside and inside diameter of non-opaque hollow fibers has now been discovered. This apparatus comprises: (a) an incoherent light source, (b) a means for positioning a hollow fiber in the path of light from the light source; (c) at least one photosensitive detector adapted and positioned so as to measure differential light absorption by the fiber across the width of the fiber in a direction perpendicular to the axis of the fiber, and (d) a means for relating differential light absorption to outside and inside dimensions of the hollow fiber.

A method for measuring hollow fiber dimensions and determining fiber morphology using the aforementioned apparatus is also claimed.

DETAILED DESCRIPTION OF THE INVENTION

Hollow Fibers

Figure 1:
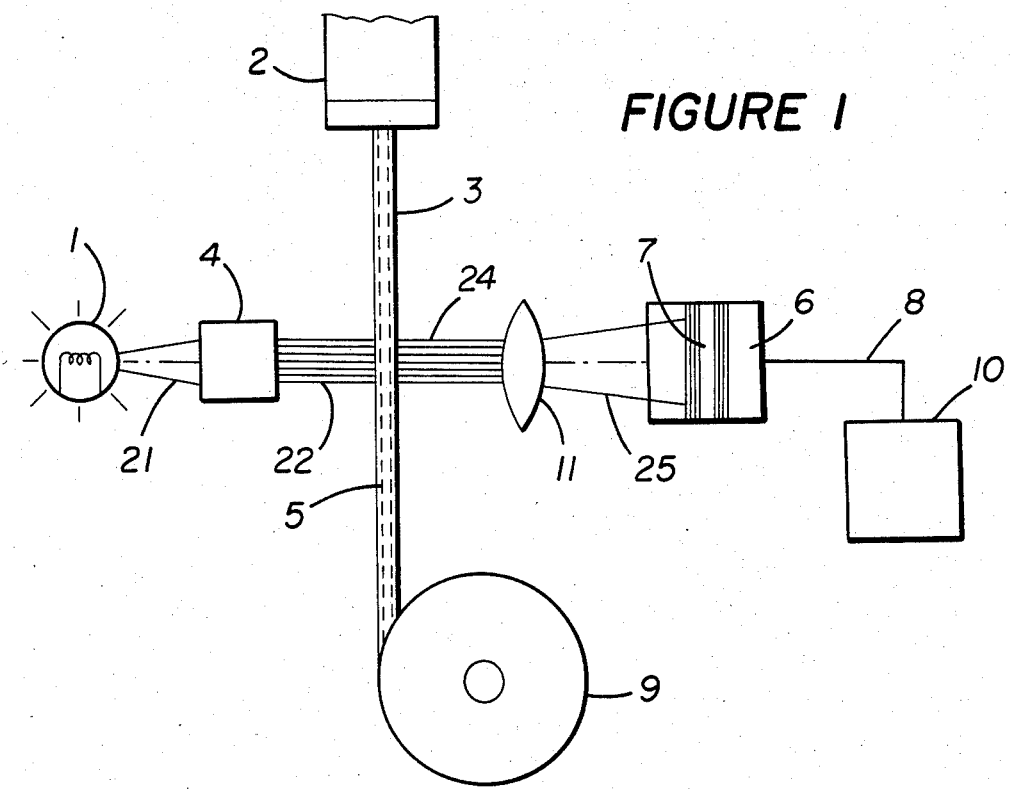
FIG. 1 is a schematic depiction of an embodiment of the subject apparatus.

The hollow fibers measured by the aforementioned apparatus are well-known. In general, the fibers must not be of a composition or size which absorbs essentially all radiation incident on the fiber, i.e., must be non-opaque. Further, the fiber must not possess excessive reflection, refraction or diffraction. In general, glass hollow fibers and organic, polymeric hollow fibers can be measured by the subject apparatus. Hollow fibers made from cellulose esters, such as cellulose acetates, polyolefins, such as polyethylene, polypropylene and poly(4-methylpentene-1), polysulfones and polyamides are operable.

Preferred are hollow fibers having an inside diameter of from about 25 to about 1900, more preferably less than about 300 microns. An outside diameter of from about 35 to about 2000 is preferred, more preferably less than about 400 microns. A wall thickness of at least about 5 microns is generally preferred.

The fiber advantageously does not contain opaque inclusions in the region in which light adsorption is measured. Examples of preferred hollow fibers and techniques for their fabrication are presented in U.S. Pat. No. 4,421,529, which is incorporated herein by reference.

The hollow fiber is preferably cylindrical with a concentric cylindrical bore. Other fiber and bore shapes are operable, provided the fiber is measured from a sufficient number of different perspectives to determine the dimensions necessary to define the fiber bore geometry.

Incoherent Light Source

The light source can be any conventional source which generates incoherent light of an intensity required to provide a good absorption pattern. A good absorption pattern is one which provides clear discrimination and constrast between the regions of the fiber absorbing the most light and those regions absorbing less light. Complete absorption of light by the fiber is not desired. For example, an incandescent light or mercury arc lamp is suitable. A stroboscopic light having a fresh of short duration is advantageous when the fiber is moving. It is desirable that the light be emitted by essentially a point source or that a collimator be used to provide respectively divergent or essentially parallel rays of light incident on the hollow fiber. Parallel light rays are preferred.

Depending on the sensitivity of the photosensitive detector to specific wavelengths of light, sources emitting light in the infrared, visible, ultraviolet or far ultraviolet regions are operable. Wavelengths of about 200 to about 900 nanometers are preferred. In general, visible light (400 to 700 nanometers in wavelength) is more preferred. Polychromatic light sources are generally operable. In instances where the shape of the absorption peaks is to be used to give an indication of the morphology or composition of the hollow fiber, monochromatic incoherent light may provide valuable information. For example, if one component of a polymer blend selectively absorbs light of a certain wavelength, use of light of this wavelength can provide an indication of the distribution of this polymer.

Means for Positioning Fiber

The hollow fiber membrane should be positioned in the path of light from the light source to the photosensitive detector so that a focused, well-defined image of the light transmitted by the fiber is projected on the photosensitive detector. Where the detector response and registering of the absorption values are relatively rapid compared to fiber movement, some fiber movement can be tolerated during measurement of the fiber dimensions. Consequently, it is not always essential that the fiber be maintained absolutely stable relative to the photosensitive detector and light source.

Where fiber dimensions are being measured on-line as a hollow fiber is extruded from a spinnerette, a roller drawing down or applying tension to the spun fiber may restrict fiber movement sufficiently to permit measurement of the fiber when a rapid-response detector, e.g., a diode-array camera, is used. Fiber guides can also be used in close proximity to the portion of the fiber through which light absorption is measured. These guides can be polished surfaces in close proximity to the moving fiber so as to restrict lateral movement without abrading or otherwise deleteriously affecting the fiber. Optionally, a fluid, such as air, can be passed between the guide and the fiber.

When a stationary section of fiber is to be measured, it can be readily clamped or otherwise restrained in place. Advantageously, the means of restraint should not crush, deform or deleteriously affect the fiber.

In one preferred embodiment of this invention, means is provided to either rotate the fiber for measurement or to rotate the light source and detector about the fiber. Means for rotation is especially advantageous where the fiber or its bore is not cylindrical or not concentric. The rotation facilitates the determination of the light absorption of the fiber from several different perspectives. The light absorption data can then be used to determine the dimensions of the fiber and fiber bore, as well as the fiber geometry.

Photosensitive Detector

A variety of photosensitive detectors known in the prior art can be used in the subject apparatus. It is of course necessary that the detector selected have sufficient range in the measurement of varying light intensities to accurately register the differential light absorption across the width of the fiber. The term fiber width as used herein refers to a dimension essentially perpendicular to the fiber's axis in the region of measurement. Photographic means can be used to produce an image depicting the light absorption of the fiber in a plane perpendicular to the incident light. A single, small, solid-state photodetector can be used to measure light absorption at different regions of the fiber, by movement of the photodector through the absorption silhouette or by use of a mirror, prism or equivalent device to project light transmitted by different regions of the fiber onto the photodetector. Preferably, an array of photodetectors, such as a diode array camera, is used to monitor light transmitted by different regions across the width of the fiber. Other operable photosensitive detectors, such as a vidicon, and other operable configurations of these devices will be apparent to one of ordinary skill in this field.

It is desirable that the light transmitted by the fiber be focused in the plane of the photosensitive detector to provide a high degree of resolution between areas of differing degrees of light absorption. The detector should be shielded from extraneous light. In some instances it will be desirable to enlarge the image of the fiber projected on the detector. Lenses can be used in the conventional manner to focus or enlarge the absorption image produced by light transmitted through the fiber. Mirrors, prisms and like optical components can be used to project the image onto the detector, if desired.

Means for Relating Light Absorption to Fiber Dimensions

Figure 2:
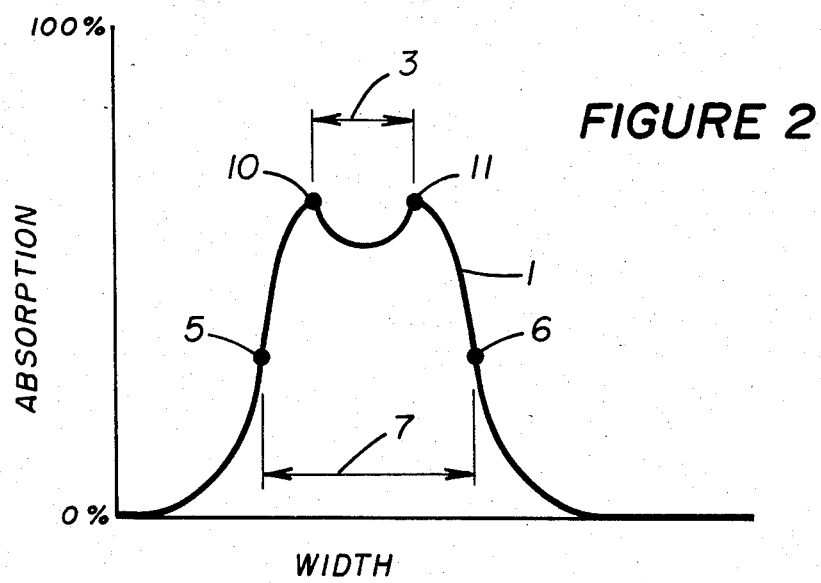
FIG. 2 is an illustrative graphical representation of a typical light absorption pattern made by a hollow fiber.

Typically, the absorption pattern of the hollow fiber can be represented by two peaks joined by a small valley, as depicted in FIG. 2. It has been found that the two regions where maximum light absorption in the hollow fiber is observed correspond to the walls of the bore in the fiber. Of course, the two regions where absorption begins represent the external surface of the fiber. Hollow fibers of known dimensions and the same composition as those to be measured are conveniently used to calibrate the subject apparatus.

It is frequently difficult to determine with precision where absorption begins due to signal noise. Accordingly, it is preferred that other absorption information be used to determine the outside diameter of the fiber. It is possible to determine the inside and outside diameter of a hollow fiber from empirical formulae relating these dimensions to the two maxima in absorption and the absorption in the valley between the two absorption peaks. This method while operable, in general, is not as accurate as the preferred method outlined hereinafter.

Preferably, the fiber dimensions can be calculated from empirical formula relating bore dimensions of the fiber to the distance in the absorption image between the absorption peaks. The outside dimensions of the fiber can be calculated from the distance between points in the absorption image which are a predetermined percentage of the maximum absorption. Conveniently, half-peak points can be used. The points on the leading edge of the first peak and trailing edge of the second peak where the absorption is one-half of the maximum absorption are referred to herein as the half-peak points (HPP). The distance between the HPP, $S_{HPP}$, can be related to the outside diameter, O.D., of the fiber by the formula $$O.D. = (A \cdot S_{HPP}) + B$$

wherein A and B are constants. The constants A and B can be readily determined using at least two fibers of known but different dimensions to calibrate the apparatus. Preferably, the hollow fibers used for calibration have the same composition as the fibers to be measured using the calibrated apparatus.

The inside diameter, I.D., of the bore of the hollow fiber is related to the distance between the two regions of maximum absorption, $S_{Max\,A}$, by the formula $$I.D. = (C \cdot S_{Max\,A}) + D$$

wherein C and D are constants. The constants C and D can be determined by calibration in the same manner as the constants A and B hereinbefore.

If the photosensitive detector is photographic in nature, a densitometer can be used to identify the regions of maximum absorption and half-peak height. If a detector array is used which converts light intensity to an electrical signal, the array can be monitored and the signal displayed by use of an oscilloscope and other conventional equipment.

The distance between the regions of maximum absorption and the distance between the half-peak points in a photographic or electronic display of the absorption image can be determined manually or electronically using known techniques and equipment. In a preferred embodiment of the invention in which a diode array camera is used as a detector, a microprocessor interrogates each diode in the array in turn at a constant sweep speed so that the distance between the absorption points of interest can conveniently be related to the time interval between interrogation of the respective diodes containing this information. The microprocessor is programmed to identify the maximum absorption points and HPP, calculate $S_{Max\ A}$ and $S_{HPP}$ as a time interval and to calculate I.D. and O.D. of the hollow fiber using programmed calibration constants.

The shape of the absorption pattern can also be compared to absorption of hollow fibers of similar composition and known morphology to determine information related to morphology of the hollow fiber. In this embodiment of the invention, it is more accurate to use absorption data from a multiplicity of points on the absorption pattern and determine by standard statistical methods the best fit for this data as extrapolated from predetermined absorption pattern/morphology relationships.

FIG. 1 is a schematic representation of a preferred embodiment of the subject invention. Peripheral components serving known functions, such as power supplies and light shielding, have not been depicted for sake of clarity and simplicity in the drawing. Light 21 from an incoherent light source 1 is passed through a collimator 4. Essentially parallel rays of light 22 from the collimator 4 shine on a hollow fiber 3. The hollow fiber 3 (including a lumen defined by the inner wall 5 of the fiber 3) is extruded from a spinnerette 2 and tensioned by a roller 9. The light 24 passing through the fiber 3 is focused by a lens 11. The light 25 from the lens 11 is projected on a photosensitive detector 6 to provide an image 7 of the fiber's light absorption. Information from the detector 6 is transmitted by a line 8 to a microprocessor 10, which calculates fiber dimensions from this information.

FIG. 2 is a graphical representation of the typical light absorption of the hollow fiber. The double peak 1 represents light absorption at various points as registered by the photosensitive detector. This absorption pattern 1 has a first and second absorption maximum 10 and 11. The distance 3 between the absorption maximum 10 and 11 can be used to calculate the inside diameter of the hollow fiber. The absorption pattern 1 also has two half-peak heights 5 and 6 separated by a distance 7 which can be used to calculate the outside diameter of the hollow fiber in the manner described hereinbefore.

The following example illustrates the invention:

EXAMPLE 1

A diode array camera obtained from RETICON INCORPORATED having a 1-inch wide by 300 micron high array of 2048 elements was fitted with a 56-inch long extension tube and a 50 millimeter photographic enlarging lens. This combination has a magnification of approximately 29. Hollow fibers made from poly(4-methylpentene-1) having outside diameters in the range from 32 to 62 microns and inside diameters of 25 to 40 microns were positioned in turn in the field of view of the lens so as to project a fiber absorption image on the camera with the fiber axis perpendicular to the longer dimension of the diode array. The fiber and camera were shielded to limit ambient light entering the lens. A continum quartz halogen light source was positioned to illuminate the fiber, so that light transmitted by the fiber would be projected on the camera elements through the lens. An oscilloscope was connected to the camera so as to display the absorption image registered.

Standard fibers of known dimensions were used to provide calibration curves for fiber dimensions. The internal and external diameters of seven hollow fiber samples were then determined using the same apparatus and the calibration curves. The experimental internal and external dimensions coincided with those subsequently determined by microscopic examination with a standard deviation of 1.6 microns.

What is claimed is:

1. An apparatus for measurement of both the outside and inside diameter of a non-opaque hollow fiber comprising:
   (a) at least one photosensitive detector for measuring differential light absorption of a non-opaque hollow fiber in a dimension generally pependicular to the fiber's axis;
   (b) an incoherent light source which can project light on the photosensitive detector;
   (c) a means for positioning the fiber to be measured so an image of light from the incoherent source which is transmitted through the fiber is projected on the photosensitive detector; and
   (d) means for relating the differential light absorption to outside and inside dimensions of the hollow fiber.

2. The apparatus as described in claim 1 wherein the incoherent light source is a quartz lamp.

3. The apparatus as described in claim 1 further comprising a collimator positioned with respect to the light source so that incident light will be essentially parallel in the region where the fiber is positioned.

4. The apparatus as described in claim 3 wherein the photosensitive detector is a diode array camera.

5. The apparatus as described in claim 1 wherein the incoherent light source is monochromatic.

6. The apparatus as described in claim 1 wherein the incoherent light source is polychromatic 7. The apparatus as described in claim 1 further comprising a lens system positioned between the place where the fiber is positioned and photosensitive detector so as to focus the absorption image on the detector.

8. The apparatus as described in claim 1 wherein the photosensitive detector is of a type which outputs an electrical signal related to the differential light absorption across the fiber width.

9. The apparatus as described in claim 8 further comprising a computerized system programmed to analyze the electrical signal from the photosensitive detector and calculate therefrom the inside and outside diameters of a hollow fiber.

10. A method for measuring the outside and inside diameters of non-opaque hollow fibers comprising:
   (a) illuminating a hollow fiber with an incoherent light source;
   (b) positioning a photosensitive detector so as to afford a focused image of the differential light absorption of the fiber;

(c) determining by means of the photosensitive detector the differential light absorption across the width of the fiber; and (d) calculating the outside and inside dimensions of the hollow fiber from predetermined formulae relating light absorption characteristics to fiber dimensions.

11. The method as described in claim 10 wherein the light illuminating the fiber consists of essentially parallel rays of light.

12. The method as described in claim 11 wherein the light is polychromatic.

13. The method as described in claim 11 wherein the light is monochromatic.

14. The method as described in claim 11 wherein the hollow fiber is glass.

15. The method as described in claim 11 wherein the hollow fiber is an organic polymer.

16. The method as described in claim 11 wherein the photosensitive detector is of a type which emits an electrical signal related to light intensity.

17. The method as described in claim 16 wherein the absorption image is scanned across the photosensitive detector to measure light absorption across the width of the fiber.

18. The method as described in claim 16 wherein the photosensitive detector consists of a plurality of discrete photosensitive elements.

19. The method as described in claim 18 wherein the photosensitive detector is a diode array camera.

20. The method as described in claim 16 wherein a computerized system is used to analyze the electrical signal from the detector and calculate the hollow fiber dimensions.

21. The method as described in claim 20 wherein the formulae used to calculate fiber dimensions relate: (a) outside dimensions to the distance between points on the absorption image which are a predetermined percentage of maximum absorption, and (b) fiber bore dimensions to the distance between two points of maximum absorption in the absorption image.

* * * * *